(12) United States Patent
Schmidt

(10) Patent No.: US 6,662,890 B2
(45) Date of Patent: Dec. 16, 2003

(54) VEHICLE TRANSMISSION WITH A FUEL CELL POWER SOURCE AND A MULTI-RANGE TRANSMISSION

(75) Inventor: Michael Roland Schmidt, Carmel, IN (US)

(73) Assignee: General Motors Corporation, Detroit, MI (US)

(*) Notice: Subject to any disclaimer, the term of this patent is extended or adjusted under 35 U.S.C. 154(b) by 95 days.

(21) Appl. No.: 10/085,478

(22) Filed: Feb. 26, 2002

(65) Prior Publication Data

US 2003/0159865 A1 Aug. 28, 2003

(51) Int. Cl.⁷ .................................................. B60K 1/02
(52) U.S. Cl. ........................... 180/65.3; 475/2; 475/5
(58) Field of Search .......................... 180/65.3, 65.2, 180/65.6, 65.7, 65.4; 475/2, 5

(56) References Cited

U.S. PATENT DOCUMENTS

| | | | | |
|---|---|---|---|---|
| 5,931,757 A | * | 8/1999 | Schmidt | 475/2 |
| 5,935,035 A | * | 8/1999 | Schmidt | 475/5 |
| 6,083,139 A | * | 7/2000 | Deguchi et al. | 477/5 |
| 6,090,005 A | * | 7/2000 | Schmidt et al. | 475/5 |
| 6,110,066 A | * | 8/2000 | Nedungadi et al. | 475/5 |
| 6,146,302 A | * | 11/2000 | Kashiwase | 475/5 |
| 6,242,873 B1 | * | 6/2001 | Drozdz et al. | 318/139 |
| 6,334,498 B1 | * | 1/2002 | Morisawa et al. | 180/65.2 |
| 6,428,444 B1 | * | 8/2002 | Tabata | 477/3 |
| 6,464,608 B2 | * | 10/2002 | Bowen et al. | 475/5 |
| 6,480,767 B2 | * | 11/2002 | Yamaguchi et al. | 701/22 |
| 6,502,652 B2 | * | 1/2003 | Rogg | 180/65.2 |
| 6,524,215 B1 | * | 2/2003 | Schmidt | 477/3 |
| 6,533,693 B2 | * | 3/2003 | Bowen et al. | 475/5 |

FOREIGN PATENT DOCUMENTS

EP 919425 A1 * 6/1999 ........... B60L/11/18

* cited by examiner

Primary Examiner—Brian L. Johnson
Assistant Examiner—Kelly E Campbell
(74) Attorney, Agent, or Firm—Leslie C. Hodges

(57) ABSTRACT

A vehicle powertrain includes a fuel cell power source, an electronic control unit, and an electrical energy storage and retrieval assembly, which are interconnected to communicate electrical power. The powertrain also includes a multi-range electro-mechanical transmission, which supplies driving power to the transmission output shaft and from there to the vehicle drive wheels and also supplies power to a power take-off drive unit, such that cooling airflow and hydraulic power is supplied to the vehicle.

3 Claims, 2 Drawing Sheets

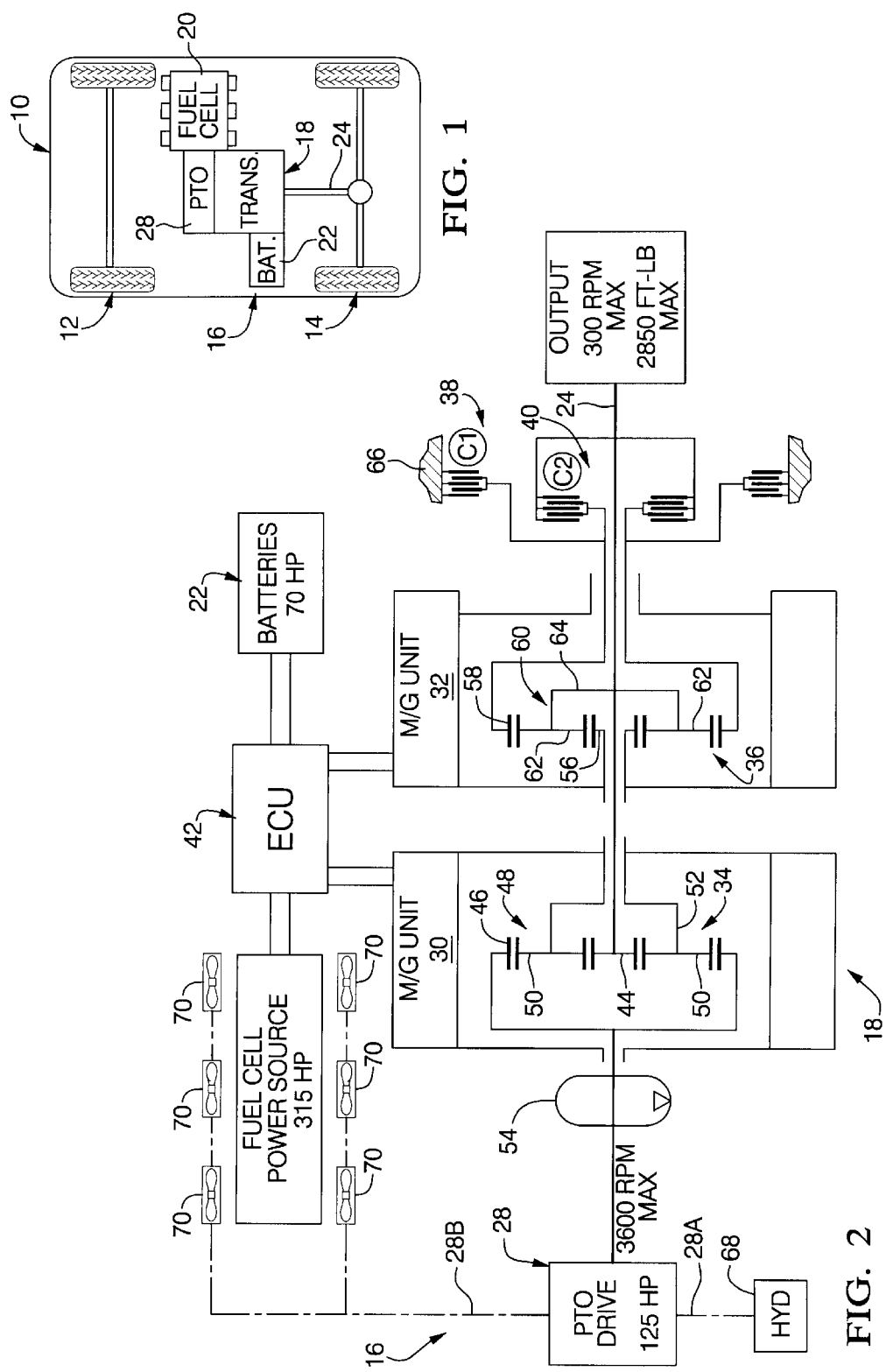

US 6,662,890 B2

VEHICLE TRANSMISSION WITH A FUEL CELL POWER SOURCE AND A MULTI-RANGE TRANSMISSION

TECHNICAL FIELD

This invention relates to vehicle powertrains and, more particularly, to vehicle powertrains having a fuel cell power source and an electro-mechanical multiple range transmission wherein the transmission employs two motor/generator type mechanisms, two planetary gearsets, and two torque-transmitting mechanisms.

BACKGROUND OF THE INVENTION

Vehicular powertrains are employed to provide traction drive forces for many types of vehicles. In most of the present vehicles, a powertrain employing an internal combustion engine or other mechanical power source is combined with either a multi-speed power transmission or with a variable speed power transmission. The variable speed power transmissions employ either hydraulic devices, motor/generator devices, or continuously variable belt-type transmissions.

Each of these transmissions includes a mechanical power source to supply the majority of the input power for the powertrain. More recently, electrical drive mechanisms have been suggested wherein a plurality of storage batteries or electrical energy storage devices are employed to supply power to electric motors which operate in series with a gear mechanism to provide substantially a single range of operation. Even more recently, it has been considered that fuel cells can be utilized as a power source to supply electrical power to the electric motors. Again, these powertrains incorporate a series-type arrangement between the driving electric motors and the output of the transmission.

The present invention seeks to improve upon powertrains employing fuel cells as a power source.

SUMMARY OF THE INVENTION

It is an object of the present invention to provide an improved powertrain, wherein the fuel cell supplies power to a pair of motor/generator units, which are interconnected through a power of planetary gearsets to establish a drive connection with a transmission output shaft.

In one aspect of the present invention, one of the motor/generator units supplies driving forces to the power take-off unit, which operates a plurality of fan members for cooling the fuel cell power source.

In another aspect of the present invention, the power take-off unit also supplies drive mechanisms for hydraulically operated devices, such as steering and brakes for a vehicle.

In yet another aspect of the present invention, the two planetary gearsets are interconnected together and with the transmission output shaft.

In still another aspect of the present invention, a pair of torque-transmitting mechanisms are employed to control the operating condition of one of the planetary gearsets.

In a further aspect of the present invention, an energy storage and retrieval assembly is employed to provide additional power when maximum vehicle performance is required.

In a still further aspect of the present invention, an electronic control unit is employed to provide electrical connections and communications between the fuel cell, the two motor/generator units, and the batteries.

In yet a still further aspect of the present invention, the electronic control unit employs a programmable digital computer to control the operating conditions of the electrical portion of the powertrain.

In a yet still further aspect of the present invention, each of the planetary gearsets includes a sun gear member, a ring gear member, and a planet carrier assembly member, wherein the sun gear member of the first of the planetary gearsets is continuously interconnected with the planet carrier assembly member of the second planetary gearset, and with the transmission output shaft.

In still yet another aspect of the present invention, the ring gear member of the first planetary gearset is continuously connected with the power take-off unit.

In another aspect of the present invention, the planet carrier assembly member of the first planetary gearset is connected with one motor/generator unit, and the sun gear member of the second planetary gearset is connected with the second motor/generator unit.

In yet still another aspect of the present invention, the ring gear member of the second planetary gearset is selectively connectible with a stationary housing to provide a reaction member within the second planetary gearset through one of the torque-transmitting mechanisms, and selectively connectible with the transmission output shaft to establish a 1:1 drive ratio in the second planetary gearset through a second torque-transmitting mechanism.

In a yet still further aspect of the present invention, the motor/generators share power equally throughout the operating range of the transmission and the power take-off unit.

DESCRIPTION OF THE DRAWINGS

FIG. 1 is a block diagram of a vehicle incorporating the powertrain of the present invention.

FIG. 2 is a schematic and block diagram representation of the powertrain employed with the vehicle in FIG. 1.

DESCRIPTION OF AN EXEMPLARY EMBODIMENT

Figure 3:
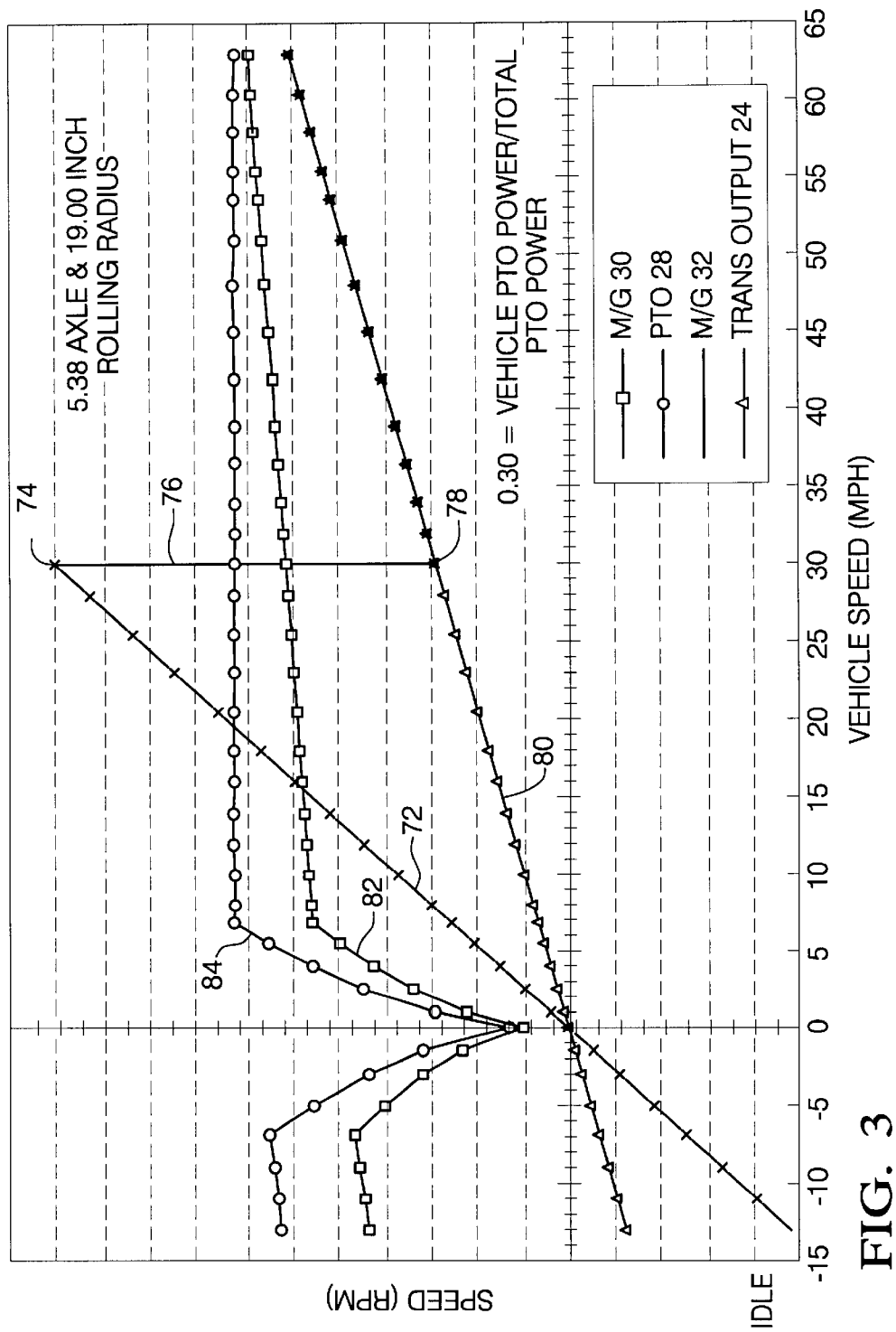
FIG. 3 is a graphical representation of the rotary speed of various elements within the powertrain relative to the speed of the vehicle.

Referring to the drawings, and particularly to FIG. 1, there is seen a vehicle 10 having a pair of steering wheels 12, and a pair of driving wheels 14. The driving wheels 14 are powered by a powertrain 16, which incorporates the multi-range power transmission 18, a fuel cell 20, and an energy storage and retrieval apparatus or battery assembly 22. The transmission 18 drives a transmission output shaft 24, which is operatively connected through a conventional final drive mechanism 26 with the drive wheels 14. The power transmission 16 also supplies power to a power take-off unit 28 including shafts 28A and 28B.

As seen in FIG. 2, the power transmission 18 includes a first electric power transfer machine or motor/generator (M/G) unit 30, a second electric power transfer machine or motor/generator (M/G) unit 32, a first planetary gearset 34, a second planetary gearset 36, a first stationary torque-transmitting mechanism or brake 38, and a second rotating torque-transmitting mechanism 40 or clutch. The motor/generator units 30 and 32 are in electrical communication with a conventional electronic control unit (ECU) 42, which is also in electrical communication with the fuel cell 20 and the battery assembly 22. The electronic control unit is a conventional electronic control device that incorporates a conventional programmable digital computer, which issues commands and directs electrical power from the fuel cell 20 to the motor/generator units 30 and 32 and also directs electrical power to and from the battery assembly 22.

The planetary gearset 34 includes a sun gear member 44, a ring gear member 46, and a planet carrier assembly member 48. The planet carrier assembly member 48 includes a plurality of pinion gear members 50 rotatably mounted on a planet carrier member 52 and meshing with both the sun gear member 44 and the ring gear member 46. The planet carrier member 52 is continuously connected for rotation with the motor/generator unit 30. The ring gear member 46 is continuously connected for rotation with a transmission control pump 54 and with the power take-off unit 28. The sun gear member 44 is continuously drivingly connected with the transmission output shaft 24.

The planetary gearset 36 includes a sun gear member 56, a ring gear member 58, and a planet carrier assembly member 60. The planet carrier assembly member 60 includes a plurality of pinion gear members 62, which are rotatably mounted on a planet carrier member 64 and disposed in meshing relationship with both the sun gear member 56 and the ring gear member 58. The planet carrier member 64 of the planet carrier assembly member 60 is continuously connected with the sun gear member 44 and the output shaft 24.

The sun gear member 56 is continuously connected with the motor/generator unit 32. The ring gear member 58 is operatively connected with a torque-transmitting mechanism 38 and with the torque-transmitting mechanism 40. The torque-transmitting mechanism 38 is a conventional fluid-operated friction brake, which when engaged connects the ring gear member 58 with a stationary housing 66 of the transmission 18. The torque-transmitting mechanism 40 is a rotating-type torque-transmitting mechanism, commonly termed a clutch, which is a conventional fluid-operated friction device, which when engaged drivingly connects the ring gear member 58 with the output shaft 24.

The power take-off unit 28 supplies mechanical drive to hydraulic systems 68 and to a plurality of cooling fans 70 through the respective shafts 28A and 28B, respectively. The hydraulic systems 68 include a hydraulic pump, which supplies hydraulic fluid for the operation of vehicle brakes and vehicle steering. The cooling fans 70 supplies airflow for the fuel cell 20 to maintain the proper operating temperature within the fuel cell. The fans 70 are the largest drawer of power through the power take-off unit 28.

In the embodiment shown, the motor/generator unit 30 supplies all of the power through the power take-off unit 28 and some power to the transmission output shaft 24. The motor/generator unit 32 supplies all of its output power to drive the vehicle through the output shaft 24.

The transmission 18 has a reverse range of operation, a first forward range of operation, and a second forward range of operation. The torque-transmitting mechanism 38 is engaged during both the reverse range of operation and the first forward range of operation. The torque-transmitting mechanism 40 is engaged during the second forward range of operation. Therefore, those skilled in the art will recognize that the output speed of the unit speed during the first range of operation is greater than the output speed of the transmission output shaft 24 and is equal to the output speed of the transmission output shaft 24 during the second range of operation.

This is seen in FIG. 3, where the output speed of the motor/generator unit 32 progresses along the line 72 to a point 74, where the stationary torque-transmitting mechanism or brake 38 is disengaged and the rotating torque-transmitting mechanism or clutch 40 is engaged. The output speed of the motor/generator unit 32 therefore decreases rapidly along line 76 to a point 78 where it is equal to the output speed of the transmission, which is represented by line 80.

The speed of the motor/generator unit 32 can be controlled during the deceleration phase by two methods. The output motor/generator unit 32 can be operated as a generator and the output electrical power therefrom delivered to the batteries 22 or across a plurality of resistance, not shown. The output speed of the motor/generator unit 32 can also be controlled by the on-coming friction device, torque-transmitting mechanism 40, which will absorb the energy required to decrease the speed of the motor/generator unit 32. As an alternative, both of these conditions can be employed simultaneously to establish a deceleration of the motor/generator unit 32.

As seen in FIG. 3, the speed of the motor/generator unit 32 is greater than the speed of the output shaft 24 during the first range of operation and equal to the speed of the output shaft 24 during the second range of operation. The output speed of the motor/generator unit 30 is shown as line 82 in FIG. 3. The speed of the power take-off unit 28 is shown as line 84 in FIG. 3.

It should be noted that the speed of the power take-off unit 28 closely follows that of the motor/generator unit 30. The speed of the power take-off unit 28 is always greater than the speed of the motor/generator unit 30 due to the fact that the planetary gearset 34 provides an overdrive connection between the planet carrier assembly member 48 and the ring gear member 46. It should also be appreciated that a portion of the output power of the motor/generator unit 30 is directed to the sun gear member 44, which is added to the output power of the motor/generator unit 32 to supply driving power to the wheels 14.

It will be noted in FIG. 3 that the output speed of the motor/generator unit 30 does not equal zero whenever the vehicle is being operated. At zero vehicle speed, which is a neutral condition, the motor/generator unit 30 is rotated at approximately 500 rpm, as shown in FIG. 3, to maintain the power take-off unit 28 in operation, such that the cooling fans 70 will be operated to ensure that the fuel cell 20 is given cooling flow during the neutral or idle operation.

The curves or lines shown in FIG. 3 are simulated for the operation of a vehicle having approximately 44,000 pounds of gross vehicle weight. The rolling radius of the wheels 14 is approximately nineteen inches. The sun gear members 44 and 56 will have 31 teeth, and the ring gear members 46 and 58 will have 89 teeth. The battery assembly 22 is capable of producing seventy horsepower of electrical energy; the fuel cell 20 is capable of producing 315 horsepower of electrical energy. The power take-off unit 28 absorbs a maximum of 125 horsepower at a speed of 3600 rpm. The transmission pump 54 draws approximately six horsepower maximum to supply control fluid and cooling fluid to the transmission 18. The motor/generator unit 30 has a continuous horsepower rating of 175 horsepower at a speed of 5700 rpm, although it is not rotated at this speed during operation. The motor/generator unit 32 has a stall torque of 725 foot-pounds and a maximum speed of 5700 rpm.

During the operation of the vehicle at a maximum speed of approximately 63 miles per hour, the transmission output shaft 24 rotates at approximately 3000 rpm. At launch condition, that is zero vehicle speed, the output shaft 24 is capable of transmitting approximately 2800 foot-pounds of torque.

The powertrain 16 described above will therefore supply the driving power for a vehicle having the above-noted operating conditions without the use of an external prime mover, such as an internal combustion engine. Also, the powertrain 16 will supply two ranges of forward operating speeds with two planetary gearsets and two torque-transmitting mechanisms.

Obviously, many modifications and variations are possible in light of the above disclosure. However, the invention is to be evaluated within the scope of the appended claims.

What is claimed is:

1. A powertrain comprising:

a fuel cell power source;

an electrical power storage and delivery means;

an electronic control unit controlling power from said fuel cell power source to and from said electrical power storage and delivery means;

a transmission output shaft;

a power take-off output shaft;

a first electric power transfer machine communicating with said electronic control unit to receive electrical energy from and deliver electrical energy to said electronic control unit;

a second electric power transfer machine communicating with said electronic control unit to receive electrical energy from and deliver electrical energy to said electronic control unit;

a first planetary gearset including a first member connected with said first electric power transfer machine, a second member continuously connected with said power take-off output shaft, and a third member continuously connected with said transmission output shaft;

a second planetary gearset including a first member continuously connected with said second electric power transfer machine, a second member continuously connected with said transmission output shaft, and a third member;

a first selectively engageable torque-transmitting mechanism connectible with said third member of said second planetary gearset to retard rotation thereof during both a reverse range of operation and a first forward range of operation; and a second selectively engageable torque-transmitting mechanism operatively interconnecting said third member of said second planetary gearset and said transmission output shaft during a second forward range of operation.

2. A powertrain comprising:

a fuel cell power source;

a battery assembly;

an electronic control unit controlling power from said fuel cell power source and to and from said battery assembly;

a transmission output shaft;

a power take-off output shaft;

a first electric motor/generator communicating with said electronic control unit to receive electrical energy from and deliver electrical energy to said electronic control unit;

a second electric motor/generator communicating with said electronic control unit to receive electrical energy from and deliver electrical energy to said electronic control unit;

a first planetary gearset including a planet carrier assembly member having a planet carrier member connected with said first electric motor/generator, a ring gear member continuously connected with said power take-off output shaft, and a sun gear member continuously connected with said transmission output shaft;

a second planetary gearset including a sun gear member continuously connected with said second electric motor/generator, a planet carrier assembly member having a planet carrier member continuously connected with said transmission output shaft, and a ring gear member;

a selectively engageable fluid-operated brake mechanism connectible with said ring gear member of said second planetary gearset to retard rotation thereof during both a reverse range of operation and a first forward range of operation; and a selectively engageable fluid-operated clutch mechanism operatively connectible between said ring gear member of said second planetary gearset and said transmission output shaft during a second forward range of operation.

3. The powertrain defined in claim 2 further wherein:

said power take-off output shaft is continuously drivingly connected with a cooling fan assembly to provide cooling flow to said fuel cell power source.

* * * * *